US010803126B1

(12) United States Patent
Crandall et al.

(10) Patent No.: US 10,803,126 B1
(45) Date of Patent: Oct. 13, 2020

(54) METHOD AND/OR SYSTEM FOR SORTING DIGITAL SIGNAL INFORMATION

(75) Inventors: Richard Crandall, Portland, OR (US); Mark Gesley, Oakland, CA (US); Brandon McPhail, Northampton, MA (US)

(73) Assignee: Robert T. and Virginia T. Jenkins, Sacramento, CA (US), as Trustees of the Jenkins Family Trust Dated Feb. 8, 2002

( * ) Notice: Subject to any disclaimer, the term of this patent is extended or adjusted under 35 U.S.C. 154(b) by 290 days.

(21) Appl. No.: 11/332,854

(22) Filed: Jan. 13, 2006

Related U.S. Application Data

(60) Provisional application No. 60/644,344, filed on Jan. 13, 2005, provisional application No. 60/753,817, filed on Dec. 23, 2005.

(51) Int. Cl.
*G06F 16/906* (2019.01)

(52) U.S. Cl.
CPC .................... *G06F 16/906* (2019.01)

(58) Field of Classification Search
CPC ............ H04L 12/585; G06F 17/30784; G06F 17/30256; G06F 16/55; G06F 16/583; G06F 16/75; G06F 16/783; G06F 16/906
USPC .... 709/206; 707/7, 705, 722, 736, 752, 754, 707/912, 952
See application file for complete search history.

(56) References Cited

U.S. PATENT DOCUMENTS

| | | | |
|---|---|---|---|
| 5,463,777 A | 10/1995 | Bialkowski | |
| 6,161,130 A * | 12/2000 | Horvitz | G06F 17/30707 707/999.005 |
| 6,236,758 B1 | 5/2001 | Sodagar et al. | |
| 6,240,409 B1 * | 5/2001 | Aiken | 707/4 |
| 6,266,664 B1 * | 7/2001 | Russell-Falla et al. | 707/5 |
| 6,298,163 B1 | 10/2001 | Sodagar et al. | |
| 6,298,167 B1 | 10/2001 | Martucci et al. | |
| 6,381,280 B1 | 4/2002 | Lynch et al. | |
| 6,446,061 B1 * | 9/2002 | Doerre et al. | 707/3 |
| 6,621,930 B1 * | 9/2003 | Smadja | G06F 16/353 382/224 |
| 6,678,419 B1 | 1/2004 | Malvar | |
| 6,757,343 B1 | 6/2004 | Ortega et al. | |
| 6,771,829 B1 | 8/2004 | Topiwala et al. | |
| 6,785,677 B1 * | 8/2004 | Fritchman | G06F 17/30477 707/6 |

(Continued)

OTHER PUBLICATIONS

Patent Application filed Sep. 12, 2007 in related matter U.S. Appl. No. 11/854,195.

(Continued)

*Primary Examiner* — Marc S Somers
(74) *Attorney, Agent, or Firm* — Berkeley Law & Technology Group, LLP (57) ABSTRACT

Embodiments of methods and/or systems for sorting digital information are disclosed. In one particular embodiment, samples of a portion of digital information are associated with prime numerals. Such digital information may then be sorted based upon combinations of such digital information. In another example embodiment, a portion or sub-portion of a collection of digital information is converted to at least one sorting value. It should be understood, however, that these are merely example implementations and that claimed subject matter is not limited in this respect.

47 Claims, 5 Drawing Sheets

(56) References Cited

U.S. PATENT DOCUMENTS

| | | | |
|---|---|---|---|
| 6,832,244 B1* | 12/2004 | Raghunandan | H04L 51/14 709/206 |
| 7,236,639 B2 | 6/2007 | Jang | |
| 7,555,523 B1* | 6/2009 | Hartmann | H04L 12/585 709/206 |
| 2002/0001413 A1 | 1/2002 | Ratnakar | |
| 2002/0091846 A1 | 7/2002 | Garcia-Luna-Aceves | |
| 2002/0095452 A1* | 7/2002 | Perkins | 708/650 |
| 2002/0161664 A1* | 10/2002 | Shaya | G06Q 30/02 705/7.31 |
| 2003/0007683 A1* | 1/2003 | Wang | G06K 9/00456 382/159 |
| 2003/0138156 A1 | 7/2003 | Schwartz | |
| 2003/0229604 A1* | 12/2003 | Zaragoza et al. | 706/16 |
| 2003/0231798 A1 | 12/2003 | Jang | |
| 2004/0083094 A1 | 4/2004 | Zelazo et al. | |
| 2004/0114810 A1 | 6/2004 | Boliek et al. | |
| 2004/0223655 A1 | 11/2004 | Liao et al. | |
| 2005/0050150 A1* | 3/2005 | Dinkin | G06Q 10/107 709/207 |
| 2005/0060643 A1* | 3/2005 | Glass | G06F 17/241 715/205 |
| 2005/0063539 A1* | 3/2005 | Langin-Hooper et al. | 380/44 |
| 2005/0078873 A1 | 4/2005 | Cetin et al. | |
| 2006/0259533 A1 | 11/2006 | LeTourneau | |

OTHER PUBLICATIONS

Crandall et al., "Prime Numbers: A Computational Perspective", Springer ISBN 0-387-94777-9, www.springer-ny.com, 2001, Part 1, pp. 1-263.

Crandall et al., "Prime Numbers: A Computational Perspective", Springer ISBN 0-387-94777-9, www.springer-ny.com, 2001, Part 2, pp. 264—end of book.

Struzi, et al. "the Haar Wavelet Transform in the Time Series Similarity Paradigm", Principles of Data Mining and Knowledge Discovery Lecture Notes in Computer Science, 1999, pp. 12-22.

Kaplan, "Applying the Haar Wavelet Transform to Times Series Information", 2004, [online], [retrieved on Jun. 12, 2010]. Retrieved from the wayback machine <URL: http://web.archive.org/web/*/http://www.bearcave.com/misl/misl_tech/wavelets/haar.html>, 15 pages.

Struzik, Z.R., "Wavelet methods in (financial) time-series processing", INS-R0023, 2000, pp. 1-12.

U.S. Appl. No. 11/854,195: Filing Receipt, dated Sep. 24, 2007, 3 pages.

U.S. Appl. No. 11/854,195: Notice to File Missing Parts, dated Sep. 26, 2007, 5 pages.

U.S. Appl. No. 11/854,195: Notice to File Missing Parts Response, dated Nov. 26, 2007, 12 pages.

U.S. Appl. No. 11/854,195: Filing Receipt, dated Nov. 30, 2007, 3 pages.

U.S. Appl. No. 11/854,195: Requirement for Restriction/Election, dated Sep. 28, 2010, 6 pages.

U.S. Appl. No. 11/854,195: Requirement for Restriction/Election Response, dated Oct. 20, 2010, 17 pages.

U.S. Appl. No. 11/854,195: Non-Final Office Action, dated Dec. 13, 2010, 13 pages.

U.S. Appl. No. 11/854,195: Amendment/Req. Reconsideration-After Non-Final Office Action, dated Mar. 14, 2011, 16 pages.

U.S. Appl. No. 11/854,195: Final Office Action, dated May 4, 2011, 16 pages.

U.S. Appl. No. 11/854,195: Advisory Action, dated Jul. 25, 2011, 3 pages.

U.S. Appl. No. 11/854,195: Amendment After Final, dated Jul. 5, 2011, 16 pages.

U.S. Appl. No. 11/854,195: Notice of Appeal, dated Aug. 3, 2011, 2 pages.

U.S. Appl. No. 11/854,195: Appeal Brief filed Dec. 5, 2011, 54 pages, Doc 2011.

U.S. Appl. No. 11/854,195: Examiner's Answer Brief dated Jan. 18, 2012, 17 pages, Doc 2012.

U.S. Appl. No. 11/854,195: Reply Brief Brief dated Mar. 19, 2012, 16 pages, Doc 2013.

U.S. Appl. No. 11/854,195: Board of Patent Appeals Docketing Notice dated Mar. 30, 2012, 2 pages, Doc 2014.

U.S. Appl. No. 11/854,195: Decision on Appeal dated Dec. 31, 2014, 8 pages, Doc 2015.

U.S. Appl. No. 11/854,195: Request for Continued Examination and Amendment filed Feb. 24, 2015, 23 pages, Doc 2016.

U.S. Appl. No. 11/854,195: Non-final Office Action dated Oct. 15, 2015, 13 pages, Doc 2017.

U.S. Appl. No. 11/854,195: Non-final Office Action dated Mar. 14, 2016, 14 pages, Doc 2018.

U.S. Appl. No. 11/854,195: Response to Non-final Office Action dated Jun. 23, 2016, 23 pages, Doc 2019.

U.S. Appl. No. 11/854,195: Final Office Action dated Aug. 3, 2016, 18 pages, Doc 2020.

U.S. Appl. No. 11/854,195: Response to Final Office Action dated Sep. 23, 2016, 27 pages, Doc 2021.

U.S. Appl. No. 11/854,195: Advisory Action dated Oct. 6, 2016, 7 pages, Doc 2022.

U.S. Appl. No. 11/854,195: Response to Advisory Action dated Nov. 3, 2016, 34 pages, Doc 2023.

U.S. Appl. No. 11/854,195: Non-final Office Action dated Jun. 7, 2017, 11 pages, Doc 2024.

U.S. Appl. No. 11/854,195: Response to Non-final Office Action filed Sep. 7, 2017, 37 pages, Doc 2025.

U.S. Appl. No. 11/854,195: Final Office Action filed Nov. 3, 2017, 16 pages, Doc 2026.

U.S. Appl. No. 11/854,195: Examiner Interview Summary dated Feb. 8, 2018, 4 pages, Doc 2027.

U.S. Appl. No. 11/854,195: Request for Continued Examination and Amendment filed Mar. 2, 2018, 34 pages, Doc 2028.

U.S. Appl. No. 11/854,195: Non-final Office Action dated Dec. 26, 2018, 19 pages, Doc 2029.

U.S. Appl. No. 11/854,195: Response to Non-final Office Action filed Apr. 23, 2019, 37 pages, Doc 2030.

U.S. Appl. No. 11/854,195: Notice of Non-Compliant Amendment dated May 2, 2019, 2 pages, Doc 2031.

U.S. Appl. No. 11/854,195: Response to Notice of Non-Compliant Amendment filed Jun. 10, 2019, 21 pages, Doc 2032.

U.S. Appl. No. 11/854,195: Notice of Non-Compliant Amendment dated Jun. 20, 2019, 3 pages, Doc 2033.

U.S. Appl. No. 11/854,195: Response Notice of Non-Compliant Amendment filed Jul. 22, 2019, 21 pages, Doc 2034.

U.S. Appl. No. 11/854,195: Final Office Action dated Sep. 5, 2019, 10 pages, Doc 2035.

U.S. Appl. No. 11/854,195: Response to Final Office Action filed Dec. 5, 2019, 26 pages, Doc 2036.

U.S. Appl. No. 11/854,195: Advisory Action dated Dec. 18, 2019, 2 pages, Doc 2037.

U.S. Appl. No. 11/854,195: Request for Continued Examination and Amendment filed Jan. 6, 2020, 28 pages, Doc 2038.

Katajainen, Jyrky and Erkki Makinen. "Tree Compression and Optimization with Applications" 1990 [Online] Downloaded May 28, 2020 http://hjemmesider.diku.dk/-jyrki/Paper/KM90.pdf (Year: 1990), 24 pages, Doc 2040.

Murtagh, Fiann. "The Haar Wavelet Transform of a Dendrogram-I" Jun. 26, 2005. [Online] Downloaded May 28, 2020 https://pure.royalholloway.ac.uk/portal/files/4982563/fm38.pdf (Year: 2005), 25 pages, Doc 2041.

Day, William H. E. "Optimal Algorithms for Comparing Trees with Labeled Leaves" 1985 [Online] Downloaded May 28, 2020 https://link.springer.com/content/pdf/ 10. 1007 /B FO 1908061 . pdf (Year: 1985), 22 pages, Doc 2042.

Zhao, Xiaojian et al. Incremental Methods for Simple Problems in Time Series: Algorithms and experiments. 2005 [Online] Downloaded May 28, 2020 https://ieeexplore.ieee.org/stamp/stamp.jsp?tp=&arnumber=1540890 (Year: 2005), 12 pages, Doc 2039.

(56) References Cited

OTHER PUBLICATIONS

U.S. Appl. No. 11/854,195: Non-Final Office Action dated Jun. 4, 2020, 21 pages, Doc 2043.

* cited by examiner

METHOD AND/OR SYSTEM FOR SORTING DIGITAL SIGNAL INFORMATION

RELATED APPLICATIONS

This patent application claims priority to U.S. provisional patent application Ser. No. 60/644,344, titled "METHOD AND/OR DEVICE FOR SORTING DIGITAL CONTENT," filed on Jan. 13, 2005, by Crandall et al., and to U.S. provisional patent application Ser. No. 60/753,817, titled "METHOD AND/OR SYSTEM FOR SORTING DIGITAL INFORMATION," filed on Dec. 23, 2005, by Crandall et al., both of the foregoing being assigned to the assignee of the presently claimed subject matter and herein incorporated by reference.

FIELD

This disclosure is related to sorting digital information.

BACKGROUND

In a variety of contexts, having the ability to sort digital information may be desirable.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of contexts, it may be desirable to sort information, particularly information available in digital form. Relational databases, for example, employ unique keys to sort information. However, it is often desirable to sort information into categories which may not correspond to specific keys, indices, descriptors or the like. Having the ability to accomplishing sorting without such keys or indices may be desirable in a variety of situations.

Sorting generally refers to separating and/or arranging, such as by class and/or kind, for example. Sometimes, but not necessarily, sorting may be substantially in accordance with one or more particular rules. An example includes, without limitation, ordering substantially in accordance with one or more rules. Sorting may also imply ordering, partitioning, and/or categorization of elements and/or members of a set, such as, for example, the files of a database. In this context, the term digital information refers to any type of information in any form or format, such as, without limitation, audio, video, text, pictures, animation, etc., so long as the form or format comprises a digital format. For example, without limitation, such information may be transmitted as a series of binary ones and zeros.

In this context, the term information may refer to a collection of elements, such as, for example, a set of elements, such as data, and the relationships or structure relating those elements. Information is commonly processed, stored, and/or transmitted, although these are merely examples of operations that may be applied to information. A data structure may impose structure on a particular set or sets of information by establishing a relationship among the information content. Thus, one type of information may comprise structured information. As such, information, such as digital information, may in some cases include at least two characteristics: structure and content.

Structure here may imply one or more relations among at least some elements of a collection, such as, an ordering, although this is merely one type of structural relationship among elements that may comprise information, such as digital information. If a collection of information comprises data, the structure of the information may be referred to as a data structure. Examples, without limitation, of types of data structures include: format, schema, and/or other data types or relationships. As an example, data types and/or relationships among data may be associated with computers, processors, encoders, finite state machines, and/or other computing devices, for example, that may be used to store, process, and/or transmit information, such as digital information. Relatively specific examples of data structures may include records, files, tables, databases, trees, trellis-codes, and/or state diagrams, such as, may be, for example, associated with processing and/or encoding information. Likewise, it is noted that some of these foregoing structures may also imply storage of data, although these are merely examples and structures exist that do not necessarily imply storage.

Content here refers to that portion of information, such as data, for example, that may be considered or evaluated largely independent of information structure. Content may comprise, for example, a multi-set of data elements. A multi-set in this context may comprise a set-like object, such as a collection of elements, for example, in which order is substantially ignored, but, in which, in this example, multiplicity is explicit: Multiplicity here refers to the notion that an element of a multi-set, for example, may appear more than once in a collection, for example. Here, then, multiplicity may be employed to distinguish a multi-set from a set. In the latter case, for example, an element of a set appears once as a member of that set.

A database D may comprise a multi-set or collection of files, designated here as $\{F_i\}$, for example. A file may also comprise a multi-set, such as $F_i$, of data, for example. The information contained in a given file $F_i$ may also or in addition comprise data content, with associated data structures. These structures, or relations contained within $F_i$, may represent a range of complexity, e.g. a table, nested cells comprised of a tree structure with leaves containing data, and/or a string of characters, to name just a few examples.

In this context, sorting a database D may imply sorting a collection of files $\{F_i\}$, for example. Information included within a given file may also, in some situations, be indexed and/or scored by transforming and/or operating on the structure and/or the content of information included within the file. These operations may include, for example, filtering, parsing, tokenizing, mapping, and/or forming various arithmetic, mathematical, logical and/or other combinations of elements and/or operations among members and/or elements, although, of course, this is not an exhaustive list of possible operations that may be employed.

A text file, for example, may include formatted information, which may comprise, for example, data with record fields and/or strings. Text files may be available in various formats and claimed subject matter is not limited in scope to a particular format, to text files, or even to files. However, examples of formats include alphanumeric formats, such as ASCII, Unicode and/or WideChar, for example. A string here may comprise an ordered sequence of characters. Depending at least in part on the context of use, a string may comprise an ordering relation among its elements and/or may comprise a data element itself. A character here may comprise a symbol, datum, element, or member of a file specified by a particular data format.

Elements of a file, such as a text file, may employ a variety of structures, one common example including a tabular structure, although, of course, claimed subject matter is not limited in scope in this respect. Thus, in such an example, a file may comprise a collection of records, in which the records themselves comprise fields of data. Sorting text files having a tabular data structure may be desirable in some cases. Of course, extracting information from such a form of data, depending at least in part upon the particular application, for example, may, at times, prove challenging, particularly in situations in which the information sought is not readily identifiable as specific records or fields of such a tabular structure.

A text file may alternately or additionally include a collection of strings or characters, e.g., an email message may be one common example. A text file may also contain structure separate from a body in which the body, for example, may comprise text strings. As one example, a file may include header information, which may include data or information formatted for use, for example, in connection with networking transmission protocols and the like, although claimed subject matter is not limited in scope in this respect, of course. However, depending at least in part upon the particular context and/or application, techniques for sorting text files, e.g., email messages in this example, may make beneficial use of structural information, such as, for example, a header, and/or content information, such as, for example, data contained within a body portion of a file as text, for example.

Without limitation, an example situation in which sorting such information may be desirable may include the receipt of an input text file, e.g. electronic mail, email messages, bills, or other assemblages of text, which may include structural information, e.g. headers, keys, or records, and content, e.g. character strings or characters. Text content may, for example, be included as part of email body content, or as data contained within fields defined by records, although, again, claimed subject matter is not limited in scope in this respect.

For example, depending at least in part on the particular situation, one may imagine that it may be desirable to generally sort a database comprised of input files, such as input text files, for example, into various categories. Another example may include sorting email messages between those a recipient may desire to read from those a recipient may not desire to read. If the messages are sorted with a relatively high degree of accuracy, this may save a recipient time in that he or she may have such messages automatically sorted or categorized, e.g., he or should avoid reading some messages by having them "pre-sorted."

One potential challenge for a sorting process, however, involves sorting digital information in the absence of unique keys or other readily accessible categorization or identifying information. Hence; in some situations at least, it may be desirable to have the ability to extract implicit, previously unknown or unrecognized relationships among digital information to be sorted.

In one particular embodiment, digital information to be sorted may be encoded, potentially including data content, structure and/or relationships among data content. Likewise, efficient sorting of such encoded information may be applied. For example, in one embodiment, a database of digital information may be sorted by treating member files as multi-sets in which multi-sets are decomposed into structure and content, although claimed subject matter is not limited in scope in this respect.

In this particular example, content objects may be represented as tokens, indices, numerals and/or other forms of numerical content for efficient sorting. Category training may be applied, such as to an existing or known database of content objects, for example, to create such numerical content, such as assigned numerals, for example, for use in sorting other databases so that categories or other sorting are to be obtained. Thus, as explained in more detail below, tokens and/or indices assigned in this particular embodiment to assist in sorting may be referred to as assigned numerals or assigned values.

Assigned numerals and/or their representations may be used in conjunction with content objects of a database to be sorted, for example. One technique to accomplish this may include assigning numerical representations to content objects of the database to be sorted using the same or a similar approach to that employed for category training, as described above, although claimed subject matter is not limited in scope to such an approach.

Assigned numerals that represent content objects may then be employed to determine or detect information about the database to be sorted. In particular, in one embodiment, although claimed subject matter is not limited in scope in this respect, assigned numerals for a database to be sorted may be combined to form one or more sorting numerals. Likewise, such sorting numerals may be compared with sorting numerals for the database previously employed for category training to accomplish sorting of a previously unsorted database. This detected information about a previously unsorted database may be referred to here as detected images for convenience, where the term image or detected image refers to y in the mapping, M, as follows:

$$y = M(x)$$

As shall be described in more detail hereinafter, efficient processes may be employed to obtain such detected images using sorting numerals. Likewise, to accomplish efficient sorting, detected images may, in at least some embodiments, be combined with structure indices and/or weighted factors to derive file scores that may be employed to conveniently accomplish such sorting. Likewise, in at least some embodiments, sorting may be improved by employing one or more feedback mechanisms to affect score distributions. Likewise, in at least some embodiments, this may be accomplished while also employing user-defined parameters, for example, to assist in sorting.

Without limitation, example situations in which sorting such information or content may be desirable includes the receipt of text files, as previously indicated, e.g. electronic mail, email messages, etc. For example, although claimed subject matter is not limited in scope in this respect, one example of such sorting is described in previously filed U.S. provisional patent application Ser. No. 60/644,344, titled METHOD AND/OR DEVICE FOR SORTING DIGITAL CONTENT, filed on Jan. 13, 2005, by Richard Crandall et al. However, another example may include sorting a collection of bills. Bills may include semi-structured documents and/or structured input data, such as may appear in a relational database, e.g. tables of data, bills or spreadsheets. In this example, structure may include relational schema, such as various fields and records imposed on the bill format and content may comprise data in the associated fields.

Although claimed subject matter is not limited in scope in this respect, for this particular example, e.g., bill sorting, an embodiment of a sorting method may include the following processes: encoding, file scoring, database ordering, database sorting, and learning feedback. Of course, other embodiments may employ fewer than these processes, additional processes or modifications of these processes. These are described in more detail below for this particular embodiment, however. It is noted here, of course, that throughout this specification the terms file and database are used in a generic sense. Thus, the term file here refers to some sub-segment of stored digital information and is not intended to denote a particular format or structure of digital information storage. Likewise, the term database here refers to a collection of stored information and is also not intended to denote a particular format or structure of digital information storage.

In one particular embodiment, encoding may be applied, such as previously described. In this particular embodiment, a collection of digital information, e.g. a database, such as a database including a collection of files, may be encoded. For example, in one potential embodiment, a member of such a database, such as a file, in this example, may include digital information that comprises file structure and/or file content. Thus, continuing with this example, an input file may be taken from a given database, and initial data preparation may be applied to the digital information, e.g., filtering, as a predecessor to subsequent encoding of the file. Of course, claimed subject matter is not limited in scope in this respect. Thus, in some embodiments, for example, encoding may include filtering and/or other types of data processing. As another example, encoding digital information may include, data parsing, although, again, claimed subject matter is, of course, not limited in scope in this respect. In such an embodiment, however, as described in more detail below, digital information may be encoded into suitable representations.

Here, for example, a file may include one or both of structural and content elements. Encoding, which here may include parsing of structure and encoding of content of the file elements, and their relationships, for example, may proceed by a variety of rules, processes, and/or methods. Thus, it is intended to include a variety of types of data processing now known or to be later developed.

In one embodiment, parsing structure may be quantified at least in part by various application specific rules and may result in file structure indices, $Q_i$, which may be used in file scoring, for example. As one illustrative example, email text file header information may be evaluated differently than body-content. Thus, in this example, structure of the email may be used for categorization in addition to email content. For example, parsing of MIME errors, HTML tags and the like may be applied. Another example, in a different embodiment, might include XML tag elements that may be associated with a tree data structure. Thus, such structure may be parsed and/or indexed for use during file scoring. Yet another example could include one or more keys. A key in this context refers to a mechanism to govern a sorting process. It may be considered an index, or give a tabular view of data, such as by column and/or row heading, which may label the associated data in a record, as an example. Likewise, logic rules, such as may be associated with a relational database, for example, may be applied to accomplish scoring. This may depend, for example, on the particular application. For example, "logic" could comprise assigning a value based at least in part on a composite series of conditions, such as by a computer program, for example. These values might be derived from conditions determined by data, records, files and/or the like associated with the particular process, for example. Rules associated with such an application might be written into such a process, for example, and attributed with quantitative values for the scoring function, for example.

In one particular embodiment, without loss of generality, file content may be encoded by tokenizing data elements, which may comprise, for example, symbols, characters, and/or strings. A token $(t_{kN})^{\alpha}{}_k$ in this particular embodiment may comprise a fixed N-character string appearing in a given sequence within a file, although, of course, claimed subject matter is not limited in scope in this respect. For example, a kth token may appear $\alpha_k$ times within a given file. N here may comprise the number of characters for a particular token, e.g., here N is the token size. N may be assigned multiple values, such as, 1, 2, . . . as may be desirable to enhance content representation and/or for other reasons, for example.

Depending at least in part on the particular application, it may be useful to employ multiple values of N. Here, an N-char representation may be used in conjunction with other potential indices and/or tokens. Thus, here, multiple file content indices may be created, such as ones associated with a particular N-char representation of file content. However, there may be practical upper limits that are imposed on the number of N-char representations used for encoding a given set of digital information, for example, as other aspects may also be considered and trade-offs may be made, e.g. memory size allocation and/or processing speed.

Of course, it is desirable to note that tokens and/or indices in connection with digital information may take any one of a number of possible forms and claimed subject matter is not limited in scope to a particular form. For example, a token may comprise a set Of audio frequencies and/or a set of audio intensities. Likewise, a token may comprise frequencies, intensity, color, phase, etc. in video or imaging, as well. Also, whereas in the example above tokens comprise a fixed length number of characters, in other embodiments, tokens may represent variable length parameters. These are just a few simple examples. Tokens may comprise a vocabulary, a signature, and/or may include any other measurable technique for characterizing digital information, regardless of form. In general, depending at least in part on the particular embodiment, structure and/or content of digital information may be encoded. Likewise, as described in more detail hereinafter, through file scoring, indexing may also take place, although again, claimed subject matter is not limited in scope in this respect.

Figure 3:
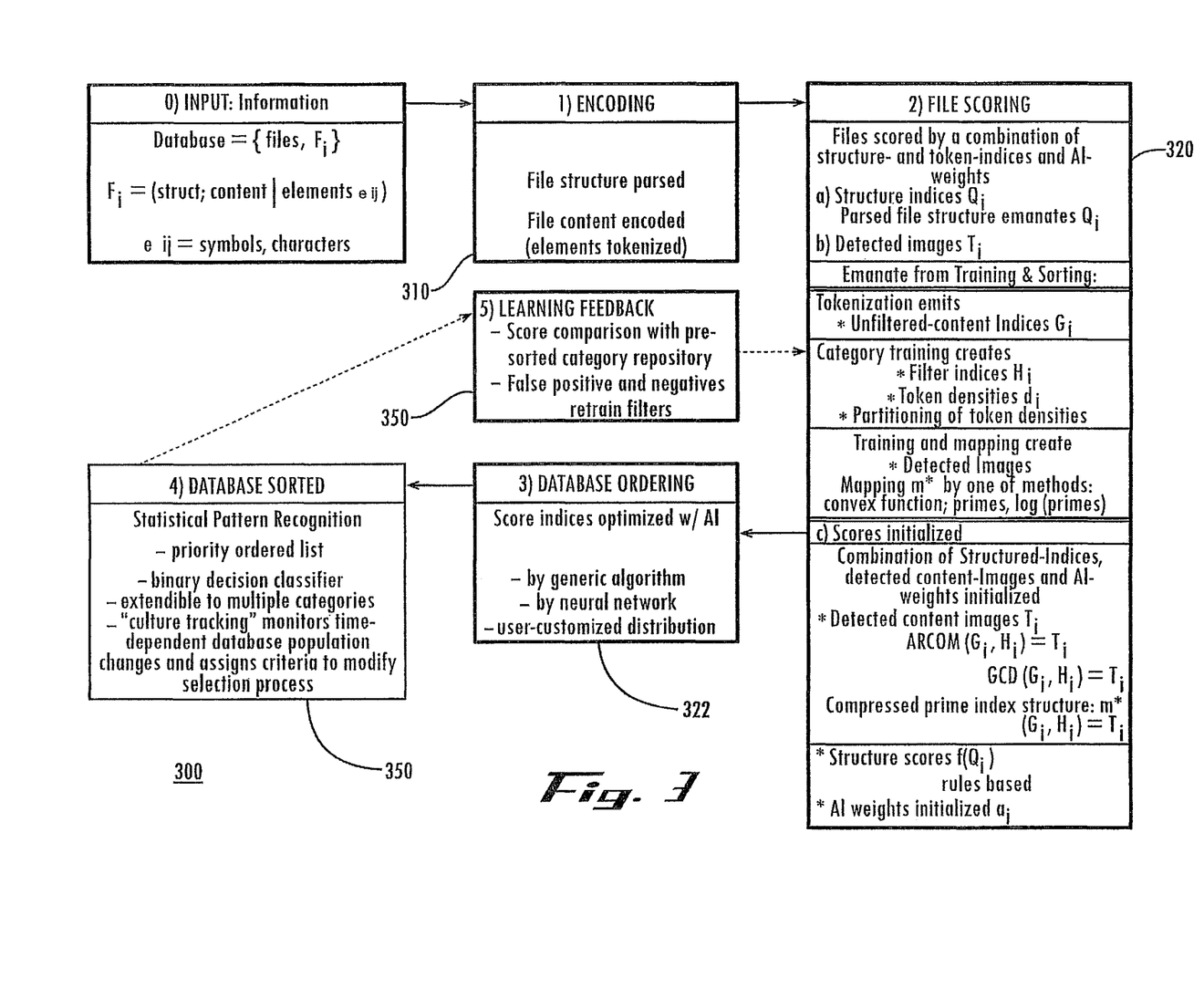
FIG. 3 is a flowchart illustrating another embodiment of a method of sorting digital information.

In this particular embodiment, file scoring, illustrated as 320 in process 300 of FIG. 3, may be applied after encoding digital information, illustrated as 310 in FIG. 3. In this particular embodiment, an element of a database, such as a file, may be assigned a score-index. A file score index in this particular embodiment may be derived from a combination of file structure indices $Q_j$, content indices $T_k$, and weighting factors, referred to here has HI weights, where HI refers to heuristic intelligence, as explained later. Of course, claimed subject matter is not limited in scope to this particular embodiment.

Although HI weights may pre-assigned and subsequently modified by one of several approaches, claimed subject matter is not limited in scope in this respect. Here, heuristic intelligence refers to a model that reassigns values to weights to improve performance and/or fitness for a particular purpose, such as via 350 or 360 shown in FIG. 3, for example. Typically, although not necessarily, this may be applied through one or more feedback mechanisms to one or more scoring parameters or components, as described in more detail below for this particular embodiment. For this particular embodiment, scoring components associated with file content may be derived from a combination of content objects that yield content indices $T_k$.

Mapping of a token to a particular combination of numerical values depends at least in part on the representation of the content object and/or the nature of the category training applied. Resulting combinations, which, in this particular embodiment, may comprise content indices, may be represented as sequences, products of numerical values, etc., as described in more detail below.

In this embodiment, content indices relate to combinations originating from content objects and/or category training. This is described in more detail below in connection with table 600 shown in FIG. 6. It is noted that in this particular embodiment, a data structure may be employed. Likewise, choice of a particular data structure may depend at least in part on a variety of different factors, including the particular application and/or efficiency considerations with respect to operations to be applied as part of an implementation, for example. Typically, therefore, it may be desirable to select a data structure to be sufficiently matched at least in part with operations to be applied, although, of course, this may vary with the particular embodiment or implementation. However, claimed subject matter is not limited in scope to a particular data structure or even to employing a data structure.

As described previously, category training, for this particular embodiment, may involve pre-sorted file samples associated with particular categories. Such samples may, of course, come from any one of a variety of sources and/or some combination thereof. This training set of files may be tokenized, such as by employing a technique as described below, for example, although claimed subject matter is not limited in scope to only employing one of the techniques described. Of course, any one of a number of training approaches may be employed. Claimed subject matter is not limited in scope to a particular approach or technique to accomplish category training.

In this embodiment, referring to 320(*b*) of FIG. 3, training tokens may be partitioned and mapped to numerical values. In one possible such procedure a defined category may be associated with a collection of assigned values corresponding to a set of tokens that may be associated with particular files, for example. As described in more detail below, this would permit combinations of such values to be used in deriving a content index and/or score index.

Figure 6:
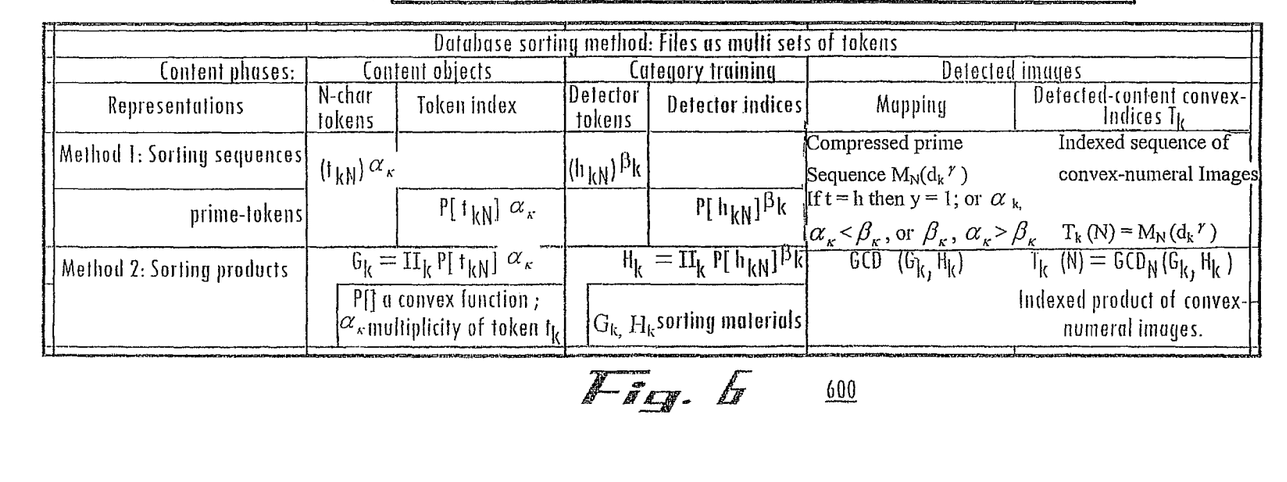
FIG. 6 is a flowchart illustrating two additional embodiments of a method of sorting digital information.

A token value to be used to form content indices may be derived from any one of a variety of methods. Two example methods, shown in FIG. 6, are described, although, it should be clear that claimed subject matter is not limited in scope to these two particular approaches.

In a first process, content objects may be represented as N-char tokens $(t_{kN})^{\alpha_k}$ where subscript k represents the $k^{th}$ token and subscript N denotes the N-char representation. Here, superscript $\alpha_k$ represents the multiplicity of the $k^{th}$ token. Thus, tokens obtained from training $(h^A_{kN})^{\beta_k}$ follow a similar indexing convention with the additional superscript A, denoting category A, to distinguish between multiple categories. Superscript $\beta_k$ represents the multiplicity of the $k^{th}$ token generated by category training, whose multiplicity may not necessarily be the same as the corresponding token appearing as a content object in digital information to be categorized, for example. Likewise, FIG. 4 illustrates a training block that includes a tokenizer 402.

In this particular method, partitioning the tokens obtained from training into categories may occur via construction of a lookup or density table. Token density $d_k$ may be measured in various ways, but generally may be correlated with token multiplicity $\beta_k$. Variations in token density measures may include normalizing multiplicity, e.g. $\beta_k/F_c$, where numbers of files, $F_c$, in the training set or, $F_{dB}$, number of files in the database, or some combination of an application specific description associated with the database modifies the value of the multiplicity. Normalization may imply an assignment of proportionality, which may be associated with file or database size depending at least in part on the given application.

Density table partitioning may occur where a token $h_{kN}$ is assigned to one of a set of potential categories, e.g., A, B, . . . etc. In this particular embodiment, an association of a token with a category, e.g $(h^A_{kN})^{\beta_k}$ may be based at least in part on multiplicity, density, and/or normalized density for the given token, such as from greater to lesser, for example. Density tables $\{d^A_k\}$, illustrated in FIG. 4 as 405, may here comprise records with fields for tokens, densities and/or multiplicities, and a category descriptor. For example, 100 tokens may be assigned to four categories based at least in part on density, although this is a simple example and is not intended to limit claimed subject matter in any way.

Figure 4:
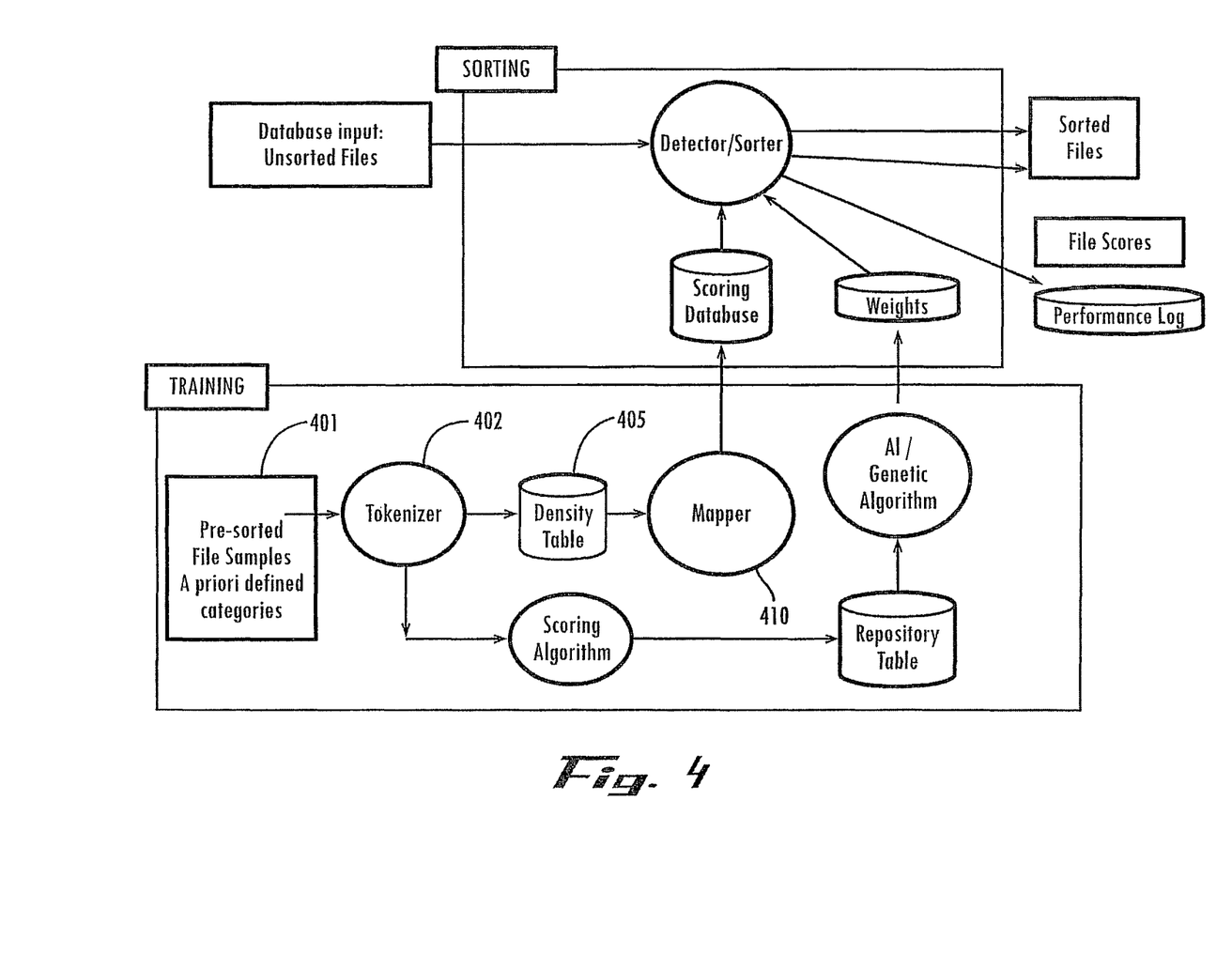
FIG. 4 is a schematic diagram illustrating an embodiment of data flow for an embodiment of a method of sorting digital information.
Figure 5:
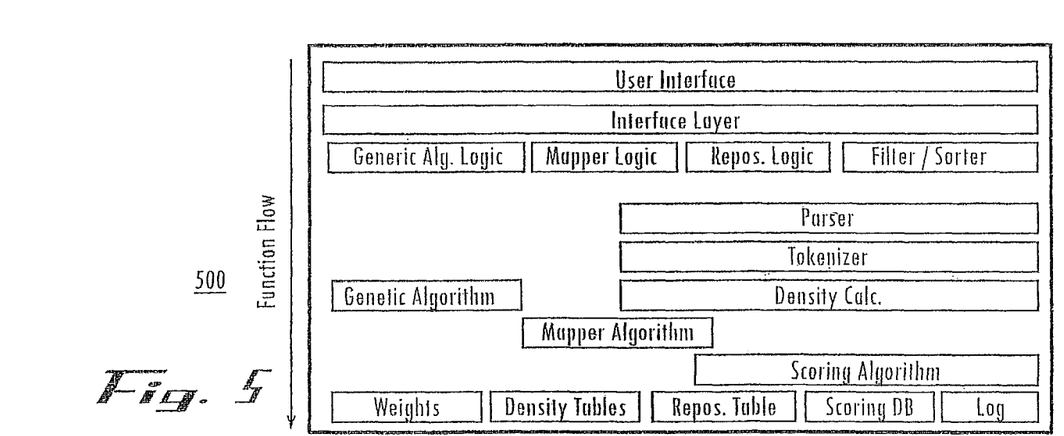
FIG. 5 is schematic diagram of an embodiment of an architecture 500 that may be used in conjunction with an embodiment of a method of sorting digital information.

Here, mapping may be applied, as illustrated in FIG. 4, such as by 410. Tokens associated with a token density table may be ranked and assigned numerical values. Assignment of numerical values to a rank ordered density table of tokens, for example, or their combinations, may be performed by a mapping operation or mapper. A mapping or assignment may be determined a variety of ways. As some examples, a family of convex functions, a selected sequence of prime numbers, a logarithmic approximation of the sequence of primes, and/or combinations thereof, for example, may be assigned. The result of this assignment may comprise an indexed sequence of values. These values in this embodiment are associated with tokens for particular categories. It is noted that here, for this embodiment, it is intended that unique values be assigned to different tokens, although claimed subject matter is not limited in scope in this respect.

The particular mapping or assignment employed may be implemented by various techniques, e.g., a lookup table or a compressed sequence of logic statements in the source code. Again, these are simply examples and claimed subject matter is not limited in scope to these examples.

For a lookup table implementation, the densities for a given category A, e.g., $\{d^A_k\}$ may be considered as pre-images of the mapper, which may produce images $m(d_{kN}^\gamma)$. These images are, therefore, related to the nature of the mapping function $m(x)$ and $\gamma$, which, in this embodiment, may represent a decision rule related at least in part to the multiplicities of the content objects, for example. Of course, claimed subject matter is not limited in scope in this respect.

The density table may, in this embodiment, be employed to associate tokens of a given input file with a relative frequency of occurrence or density. A token may be associated with one category, which has the highest density for the given token, for example. For this embodiment, therefore, for a category, the token with the highest density may be mapped to a value via a convex function, e.g., the logarithm of the largest prime in a given sequence. In one example, in descending order, the token having the next largest density may be associated with the logarithm of the next largest prime and so on. The size of the prime sequence could, for example, be associated with the number of tokens employed for a given N-char representation.

In such an embodiment, a $\gamma$ factor may be employed to reflect an associated rule used in conjunction with a mapper. For example, $\gamma=1$ may be employed to indicate that, if a particular token has been detected, the multiplicity of the content object is not considered. There are other cases where it may be useful to propagate the multiplicity, e.g., $\gamma=\alpha_k$ if $\alpha_k<\beta_k$ otherwise $\gamma=\beta_k$ if $\alpha_k>\beta_k$. Of course, this is simply an example embodiment and claimed subject matter is not limited in scope to employing such a factor.

Compression methods may also be applied in conjunction with the above mapping. For example, a tabular structure may be replaced by a set of conditional statements, as previously suggested. The resulting assignment of values from a token, such as described above, in this embodiment, may here be termed a "compressed prime index," although, again, this is simply one example embodiment and claimed subject matter is not limited in scope in this respect.

Regardless, a set of content indices, $T_k$, may be produced, as previously described. In some embodiments, these indices, $T_k$, may comprise combinations used in subsequent scoring, such as arithmetic, mathematical or logical combinations. For example, for arithmetic combinations, in another embodiment, content indices may comprise products of prime numerals, as described below. Of course, claimed subject matter is not limited in scope in this respect.

Thus, for such an embodiment, category set partitioning and token mapping may occur using a greatest common divisor (GCD) operation and/or multi-precision (MP) numerals. For example, a category A of files, which may comprise a variety of character strings, for example, may have been tokenized, as noted above, for example, through training over a database of files. The tokens may, in such a process, be mapped to numerical values any one of a variety of ways. In one example, an ASCII numerical value, which may comprise a natural number M, may be mapped to the Mth prime, P[M]. As described in conjunction with the previous embodiment, here, category set partitioning of the tokens may have occurred for the given categories of interest, for example. Likewise, the numerical values may be combined by creating a product of the values, for example.

In such an approach, therefore, common elements of an input file F and file category A may be identified by determining the greatest common divisor GCD (F,A), in this embodiment. In particular, here, file F may be tokenized as were the category A files for training. Common elements within file F and file category A, here, from the description above, may therefore comprise prime numeral representations of tokens. The common elements may therefore be identified using a GCD operation. For example, a combination of the common values may comprise a product of values, in this embodiment, a large multi-precision MP numeral $T_k=GCD(G_k, H_k)$, where, in this example, $G_k$ and $H_k$ may comprise multi-precision numerals formed by combining the value corresponding to token representations for F and A, respectively, as products.

For the particular embodiment, assigned numerals are used that correspond to tokenized content, for example, obtained from digital information. More specifically, tokenized content that appears in the digital information being categorized or sorted corresponds to tokenized content appearing in digital information used to perform category training. Likewise, a combination of such assigned or mapped numerals may be used to produce a sorting numeral.

In the particular embodiment, although claimed subject matter is not limited in scope in this respect, the one or more sorting numerals may be indicative of the presence and/or absence of particular tokenized content for particular categories of digital information. More specifically, for the particular embodiment, although, again, claimed subject matter is not limited in scope in this respect, a particular category of digital information may be represented by a sorting numeral, $H_i$. Thus, here, sorting numeral, $H_i$, may comprise a combination of assigned numerals assigned to tokenized content of a particular category, for example. Thus, in this particular embodiment, in an approach to assessing the presence and/or absence of particular content of a particular category, a combination is made between a sorting numeral, $H_i$, corresponding to that particular category of content, and another sorting numeral, representing content to be sorted. Thus, digital information, such as, for example, a text file may be sorted based at least in part on one or more such combinations, denoted here $COM_j$, depending at least in part, for example, on the number of $H_i$, in this particular embodiment, corresponding to a variety of possible categories, for example.

Although claimed subject matter is not limited in scope to employing a combination, in this context, it may provide several advantages. For example: relatively efficient processes may produce beneficial results for sorting digital information using sorting numerals, such as those being employed here. In particular, these processes for relatively large numerals, for example, are typically linear in time. Here, linear in time refers to a bit-operation complexity for a operation on N-bit operands that is O(N) in terms of execution in time, meaning "order of N". Thus, these computations may be completed quickly using state of the art technology. Of course, claimed subject matter is not limited to this particular process or to having these advantages.

While the previously described embodiment is intended to apply to any form of digital information and any one of a host of a variety of potential embodiments, a particular example application may prove instructive. In this particular example, assume an input text file $F_i$ comprises an electronic mail or email message compliant with a conventional Internet email format standard, Multi-purpose email extension (MIME).

Although claimed subject matter is not limited in scope in this respect, as is well known, this particular email format employs eight bits to designate a particular character in an email message. For purposes of simplicity, however, in this particular example, characters in the email message are limited to a Unicode ASCII value, which, for all practical purposes, defines the English alphabet. In general, Unicode provides a 256 symbol set that comprises alphanumeric and standard keyboard symbols, which includes most alphabets. In some applications, particular symbols may be filtered to facilitate operations without a significant loss of functionality or accuracy, e.g., email characters may therefore be represented with six bits rather than eight bits. In this particular example, a modified email message comprises those characters in the original email that are Unicode characters.

In this particular embodiment, a filtered Unicode/ASCII value, here, e.g., six bits, may be employed to provide encoding of particular sequences of characters, for example. In this example, the email message, as modified, may be examined on a character-by-character basis. Once this has been completed for the email, the frequency of the characters may be ranked in a table and the table may be truncated to remove lower frequency characters. Furthermore, as described more below, such characters may be divided or sorted into disjoint sets, although claimed subject matter is not limited in scope in this respect. Likewise, a similar process may be repeated on a two-character basis, a three-character basis, a four-character basis, and so on, for an email, if desired. Of course, this could be done for up to any N length character sequences, as previously suggested, but this example includes sequences of one, two, three, or four characters.

It is noted that any form or technique of digital information categorization may be employed. For example, here, an example of categories of particular content may be characterized as sequences of character strings, here of length one, two, three and four characters. Although claimed subject matter is not limited in scope in this respect, as has been suggested here, it may be convenient to view these sequences as "tokens." It is assumed that a greater number tables, created by increasing the number of token tables, would increase accuracy, but at an added "cost" of memory and/or computation.

Likewise, another form of digital information categorization may include dividing or sorting by type of content. For example, as described in more detail below, content may be sorted into two or more sets, e.g., normal email and SPAM email, for example. For example and without limitation, as previously suggested, it may be desirable to have the ability to sort or "pre-sort" email messages received between those that it is desirable to read and those that it is not desirable to read. In this particular context, email that is desirable to read shall be referred to as "normal" email and email that it is not desirable to read shall be referred to as "SPAM". Likewise, as discussed in more detail below, it may be desirable to combine different types of categorization to accomplish sorting, such as by combining categorization by tokenization with categorization by type of content. Of course, in other embodiments, a host of different categories may be employed. Examples include: personal and business; finance, romance, and health. Likewise, in other areas, such as audio, video, or pictures, for example, many other ways of sorting digital information are possible, such as based at least in part on frequency, amplitude, phase, and/or the like, for example, as was previously suggested. While the possibilities are limitless, claimed subject matter is intended to cover all such possibilities.

In this example, we start with a data base comprising files that represent presorted "normal" and "SPAM" email. This will provide the ability to construct related categories from subsamples of the database and to ultimately perform digital information sorting associated with these categories. For this particular example, a database of over twenty-three thousand emails was employed. Furthermore, the normal emails and the SPAM emails were processed using substantially the techniques previously described. Therefore, email was represented using frequency of one-character, two-character, three-character, and four-character sequences.

Frequently occurring token-sequences may be associated with separate normal and the SPAM categories, for example. If a particular sequence appears in both SPAM emails and normal emails and is included in more than one table after truncation, the particular sequence is removed from the particular table(s) (in this example, SPAM or normal) in which the frequency is lower. Thus, if a particular three letter sequence appears in both normal emails and SPAM emails with a relatively high frequency, it is removed from the three-character SPAM table if its frequency in normal email is higher and vice-versa. Thus, in this example, disjoint sets of elements for two tables representing different content categories, here normal and SPAM, may be employed. However, other methods are conceivable and included within the scope of claimed subject matter. For example, suppose email was being sorted as "technology" and "business"—in some cases, an email may properly be included in both categories. Likewise, suppose "technology" had subcategories, such as "Internet," "computers," "software," etc. In some situations, disjoint sets of elements might not be employed. However, again, these are merely examples and claimed subject matter is not limited in scope to these examples.

Continuing with this example, however, a sorting numeral may be formed for eight content categories: one-character sequences (SPAM); one-character sequences (normal); two-character sequences (SPAM); two-character sequences (normal); three-character sequences (SPAM); three-character sequences (normal); four-character sequences (SPAM); four-character sequences (normal). In this particular example, a sorting numeral is formed based at least in part on assigned numerals, in this particular example, the ASCII value for the particular tokens that appear most frequently in the particular category, although claimed subject matter is not limited in scope in this respect. For example, we define $H_1$, for this example, to comprise an arithmetic combination of assigned numerals for one-character "SPAM" sequences.

As was previously suggested, assigned numerals for a combination, in this example, an arithmetic combination, may be obtained by taking the frequently occurring characters and assigning a numeral using a predominantly convex function, in which the assigned numeral is based at least in part on the frequency of occurrence. Thus, more frequently occurring characters may be assigned greater numerals in a typical embodiment, for example. In this context, a predominantly convex function refers to a function that is convex over portions but may have portions that are not necessarily convex. The amount of convexity exhibited by a predominantly convex function may depend at least in part on the particular application or information. A predominantly convex function is sufficiently convex so that the portions of the function that are not convex do not degrade performance to such an extent that the amount of errors in categorizing digital information is not unacceptably high for the particular situation or application. Of course, a function that is convex for all values is also a predominantly convex function.

One example of a predominantly convex function is the function N log N. This type of function is useful as it is asymptotic to the distribution of prime numerals. Such a function may be employed to associate a unique numeral with a token, although claimed subject matter is not limited in scope in this respect. Further, it may provide a 1-1 mapping between tokens and an arithmetic representation. This may enable certain operations, such as, in this example, addition and/or multiplication to be employed in a self consistent algebra. Thus benefits associated with algebraic structures, such as self consistency, logical operations, and/ or unique representation of individual elements, for example, may also be adopted by the corresponding set operations associated with the digital information, although claimed subject matter is not limited in scope in this respect.

Convex functions that are prime-related may provide advantages, although claimed subject matter is not limited in scope to employing only prime-related functions. An advantage of a prime-related function may be, for example, that it assigns a numeral in a manner that permits sufficient identification of the digital information even if the assigned numeral is combined with other numerals assigned using a prime-related function. Thus, the log of prime numerals is a predominantly convex function that is prime-related. Likewise, the bit length of prime numerals is also a predominantly convex function that is also prime-related.

If precise association of numerical values with set elements represented by tokens is not a desired factor, other advantages may nonetheless be afford, e.g. high speed processing while retaining sufficient accuracy. In general, the correspondence between set theory and algebra, which may be afforded by such relationships may potentially be retained in a given application, in operating on individual elements or in evaluating a population of input files and/or file elements, for example.

In this example, although claimed subject matter is not limited in scope in this respect, the most frequently occurring characters are assigned numerals corresponding to the bit length of the largest prime numerals capable of being indexed by a six bit value, for example. A sorting numeral $H_1$ may be formed as an arithmetic combination of the assigned numerals. For example, without limiting the scope of claimed subject matter, $H_1$ may comprise a sum of such assigned numerals in one embodiment. Likewise, a sorting numeral $H_2$ may be similarly formed, for example. Since two characters are employed, the most frequently occurring characters are assigned numerals corresponding to the bit length of the largest prime numerals capable of being indexed by a twelve bit value.

Similarly, $H_3$ and $H_4$ may be likewise formed. Of course, claimed subject matter is not limited in scope to employing the bit length of prime numerals as the predominantly convex function. Other functions may be employed. Likewise, claimed subject matter is not limited in scope to employing the sum as an arithmetic combination. Many other possibilities exist for implementing a variety of different combinations, which may comprise a variety of operations, for example, also capable of providing satisfactory performance.

A similar process may be applied to form $H_5$ through $H_8$ for corresponding 1, 2, 3, and 4-character sequences in normal email, respectively. In this particular embodiment, the sequences of ASCII values are converted into an assigned numeral. However, it is worth noting here that many other techniques other than employing the ASCII value are possible. Likewise, many approaches to employing ACSII values other than the approach just described are possible. For example, a sequence of ASCII values may be modified and/or manipulated, e.g., F(sequence of ASCII values), in which F may be any mapping of a sequence of ASCII values to integer numerals that index prime numerals and thereby provide a prime-related operation. As previously suggested, a predominantly convex function, for example, may be employed. Thus, claimed subject matter is not limited in scope to any particular technique for associating numerals or values with digital information. However, using the technique previously described, eight sorting numerals, respectively corresponding to a particular content category, referred to here as normal and SPAM for one-character sequences, two-character sequences, three-character sequences, and four-characters sequences are formed.

Although claimed subject matter is not limited in scope in this respect, another technique for implementing this example may be to apply a table look up approach or compressed prime index implementation, as described above. For example, a table providing assigned numerals may be employed. In this example, the bit length of the largest prime numeral in the specified sequence would be assigned to the token and corresponding category having the highest normalized multiplicity. Rather than using a tabular data structure to effect this mapping; however, instead a set of conditional statements may be used to effect the set partitioning and assign corresponding numerical values to the tokens associated with a category.

Of course, the claimed subject matter is not limited in scope in this respect. Techniques for performing table look-ups are well-known and well-understood. Thus, this will not be discussed in detail here. However, it shall be appreciated that any and all of the previously described and/or later described processing, operations, conversions, transformations, manipulations, etc. of digital information, numerals, data, etc. may be performed on one or more computing platforms or similar computing devices, such as those that may include a memory to store a table as just described, although, claimed subject matter is not necessarily limited in scope to this particular approach. Thus, for example, a table of numerals may be formed. However, alternately or in addition, various computational techniques now known or to be later developed may be employed. Likewise, operations and/or manipulations, as described, may be performed; however, operations and/or manipulations in addition to those described or instead of those described may also be applied. It is intended that claimed subject matter cover such embodiments.

Again, continuing with this example, after "training" has been accomplished based at least in part on the reservoir of emails, as described above, assume an email is received. That email may be evaluated for the presence of one, two, three-character and four-character sequences using the approach previously described. In this example, for this particular email, this produces a sorting numeral associated with the email, designated here as where i is from 1 to 4, in this example.

With this information, for this example of this particular embodiment, an arithmetic combination of the sorting numerals for the email, the collection of $G_1$ through $G_4$, and the eight sorting numerals obtained from training on the data base of emails, $H_1$ to $H_8$, may provide an indication of whether this particular email should be sorted as either a normal email or a SPAM email. Although, as discussed below, due at least in part to the statistical nature of this particular embodiment, it may be possible that some situations may not be sufficiently determinant to justify a particular outcome one way or the other. Likewise, claimed subject matter is not limited in scope to an arithmetic combination. Many other approaches are possible and included within the scope of claimed subject matter.

Nonetheless, in this particular embodiment, as noted previously, the particular character sequences may be sorted as either occurring in SPAM or normal email. Thus, the character sequences provide mutually exclusive or disjoint sets, although, of course, claimed subject matter is not limited in scope in this respect. It may, in such a situation, for sorting purposes, for example, be convenient to form an arithmetic combination of differences for these mutually exclusive content categories, although, this is merely an example, and claimed subject matter is not so limited.

Using the nomenclature above, for example, one may establish the following scoring relationship:

$$\text{Score} = \Sigma_i a_i (COM(G_i, H_i) - COM(G_i, H_{i+4})) \quad [1]$$

where i=1, 2, 3, 4

Here, Σ represents summation and $a_i$ represents weighting of the different categories. The summation index i runs over tokenizations 1, 2, 3, and 4 in this particular example, but the number of tokenizations may be extended or reduced, in which case the H terms would be indexed appropriately, with indices i and i+t, where t is the number of tokenizations, for this particular example embodiment, mapping from ASCII sequences to selected numerals. It is noted that the weighting may also take into account normalization considerations as may be appropriate due at least in part to differing sample sizes for different categories of content and other considerations.

Likewise, as previously suggested, it may be desirable to treat the header-structure of the email separately from the body of the email in some embodiments, although, claimed subject matter is not limited in scope to these specifics, of course. Of course, relationship [1] above is just one possible formula that employs arithmetic combinations. For example, one could replace any difference of such terms with a ratio of such terms, and rescale for any appropriate or desirable categorization. Thus, claimed subject matter is not limited in scope to this or any other particular relationship. Furthermore, as previously suggested, in an alternate embodiment, it may be desirable in some situations to define or employ a sorting numeral that captures number of occurrences, referred to here as "multiplicity."

Likewise, another embodiment may explicitly include additional information structure related factors and associated weighting factors. For example, to demonstrate such an approach, in this particular situation, if Q represents the density of HTML tags in the email, R represents the number of MIME errors encountered in the email, and S the number of MIME warnings encountered in the email, relationship [1] may be modified as follows:

$$\text{Score} = \Sigma_i a_i (COM(G_i, H_i) - COM(G_i, H_{i+4})) + a_4 Q + a_5 R + a_6 S \quad [2]$$

Q may be calculated from "reading" the e-mail, for example. The number of HTML tags may be counted and divided by the number of character sequences specifically identified in the email. MIME errors can indicate one of many things, including any of the following:

- the e-mail specifies a content type that is unknown
- the e-mail specifies a transfer encoding that is unknown
- the e-mail specifies a base 64 transfer encoding
- the e-mail fails to specify a correct date
- the e-mail fails to specify a plausible return path
- the e-mail specifies a multipart content type, but fails to provide a boundary
- the e-mail lacks a subject line (not simply an empty subject line)

MIME warnings are slightly suggestive of SPAM and may indicate any of the following:

- the e-mail uses a quoted-printable transfer encoding
- the e-mail uses a binary transfer encoding
- the e-mail uses an x-token transfer encoding
- the e-mail uses a plain transfer encoding Of course, claimed subject matter is not limited in scope to including these additional factors in the weighting. Likewise, other factors may be included in addition to or in place of these. Furthermore, such factors may not necessarily be weighted linearly. Other approaches to combining factors may be employed. Claimed subject matter is intended to include all such variations.

It is noted that many other alternative embodiments are possible and included within the scope of claimed subject matter. As simply one example, scoring described above may be generalized as follows:

$$\text{Score} = \text{content indices terms} + \text{structure indices terms} = \Sigma_i a_i T_i + \Sigma_j a_j Q_j$$

where $a_i$, $a_j$ are weights capable of being determined by a variety of techniques,
such as, for example, a genetic process;
where $T_i$ are detected content indices; and
where $Q_j$ are detected structure indices.

For example, as just described above, content indices, e.g., $T_i$, in a particular embodiment, may relate to a difference between a logarithm of GCD operations, and structure indices, e.g., $Q_j$, in a particular embodiment, may relate to email header information, for example, as described above with respect to one particular embodiment.

It is likewise pointed out that while the particular embodiment described above relates to two categories, e.g., in this particular example, normal and SPAM email, the approach is extendible to multiple categories in other embodiments. For example, although claimed subject matter is not limited in scope to this particular approach, for digital information to be categorized into multiple categories, as an example, such as 4 categories A, B, C, and D, this may be accomplished conveniently in the following manner. Digital information may first be categorized as either A or "not A." If the information is categorized as "not A," then it may be further categorized as either B or "not B." If the information is categorized as "not B," then it may be further categorized as either C or D (here, "not C"). Of course, claimed subject matter is not limited in scope to four categories or to this particular approach. Many other approaches are possible and included within the scope of claimed subject matter.

Database ordering is another related process, as illustrated in FIG. 3 by 322. An initial set of file score indices which have been output from a file scoring process are employed for this particular embodiment. Here, the distribution of file score indices may be improved using heuristic intelligence or HI. Heuristic intelligence in this context refers to techniques for finding better solutions over a possible solution set where the problem is too complex to solved using traditional approaches, such as closed form or linear solution techniques, for example. Examples, without intending to be exhaustive, include genetic processing or neural network methods, for example. User-defined factors may also be employed to modify the nature of the resulting score distribution.

Although claimed subject matter is not limited in scope in this respect, one advantage of sorting based at least in part on a data base or reservoir of information is that it also provides the capability to apply any one of a number of statistical pattern recognition or other searching techniques to potentially improve results over the particular sample. If, as in this example, the database has been indexed using the scoring function, it is possible to further improve ordering of the database.

Figure 2:
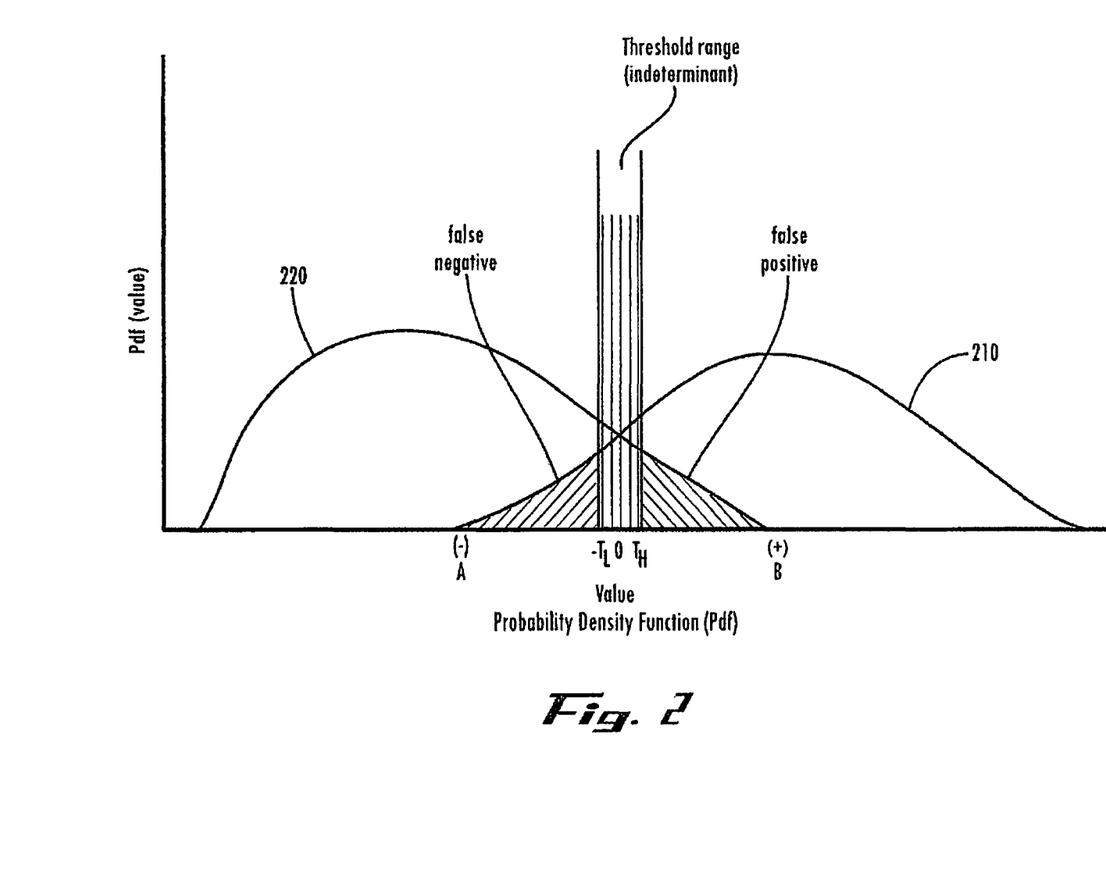
FIG. 2 is a plot illustrating a distribution of values or scores for an embodiment of a method of sorting digital information.

For example, without limitation, a genetic process might result in greater differentiation of the distributions of SPAM and normal email samples for a particular set of information, as indicated in FIG. 2, for example, and explained in more detail below. See, for example, R. Crandall, *Projects in Scientific Computation*, Springer-Verlag, 1994; R. Crandall, *Topics in Advanced Scientific Computation*, Springer-Verlag, 1996. However, claimed subject matter is not limited in scope to employing a generic process or to any particular process to reduce variation and/or increase mean separation for various distributions. Many other processes or no process may be employed and remain within the scope of claimed subject matter.

Here, we describe a particular genetic process applied to this particular example for this particular embodiment, although, again, claimed subject matter is not limited in scope to employing a genetic process or to employing this particular genetic process. For example, as suggested, a variety of heuristic approaches may be employed.

Nonetheless, in this particular embodiment, a gene specifies values for weights. We associate a gene with M parents and iterate over N generations. This particular embodiment for finding a set of weights includes:
1. Create q offspring from p parents.
2. Calculate fitness for p-q offspring.
3. Choose the p individuals as parents for the next generation and repeat.

We create new genes by mutating those of the parents. In this embodiment, a gene is mutated by modifying its weights according to a function, such as the one below. Given a positive floating point number x and two randomly chosen values, $r_1$ and $r_2$, such that such variables are defined for the interval [0,1], in this embodiment, we modify x to obtain a new value x' such that:

$$x'=M(x,r_1,r_2), \text{ in which:} \quad [3]$$

for x=0 or $r_2<1/8$, $M(x,r_1,r_2)=x+r_1$;

otherwise, $M(x,r_i,r_2)=[1+t(r)-1/2)] x$

Here, t is referred to as the mutator, a floating point value chosen by the user. Fitness is related to tolerance for erroneous sorting. In this context, we refer to a hit as a correctly scored e-mail; we refer to a miss as an incorrectly scored e-mail. If a miss is scored as "spam," we refer to it a false positive. A false negative is any e-mail that is incorrectly scored as normal. A zero score describes any e-mail that receives a value of exactly zero.

Since e-mail recipients generally prefer to receive both normal e-mails and spam than neither, for this embodiment, we do not simply reduce the number of misses, since a false positive is often considered far worse than a false negative. Thus, for this particular embodiment, we associate negative weights, or "penalties", with false positives, false negatives, and zero scores and compute the fitness of a given set of weights by penalizing misses differently according to type. Given a repository of n e-mails, for this embodiment, we compute the fitness of a gene g as:

$$f(g)=(1/n)[(\text{no. of hits})-(PFP)(\text{no. of false pos.})- (PFN)(\text{no. of false neg.})-(PZ)(\text{no. for zero value})] \quad [4]$$

in which PFP, PFN, and PZ are penalties that may be chosen to associate with false positives, false negatives, and zero scores, respectively.

As FIG. 2 suggests, a high positive value or score indicates that an email is SPAM and a low negative score indicates normal email. Curve 210 indicates schematically, under various assumptions, a potential distribution for SPAM; curve 220 indicates a similar potential distribution for normal email. Given the nature of statistical distributions, therefore, some overlap will generally take place. However, the more the means of the distributions may be separated and/or the statistical variance may be reduced, the less overlap between the overall distributions that should occur. A genetic process, such as the one described above, for example, may increase the separation of the means and/or reduce the statistical variation through selection of particular weights.

As indicated previously, from the relationships above, a value is computed that may be employed, at least in part, to sort normal email and SPAM email. However, even in this circumstance, identifying situations where the value obtained is not statistically significant in terms of distinguishing SPAM from normal email, is desirable. As illustrated in FIG. 2, thresholds may be employed to assist in identifying such situations. An upper or higher threshold, $T_H$, and a lower threshold, $-T_L$, may be employed in this fashion. These thresholds may be selected to adjust the occurrence of false positives, false negatives and/or zeros. Likewise, applying a genetic process, such as the one described above, may accomplish this implicitly, although claimed subject matter is not limited in scope in this respect.

As illustrated in FIG. 3, database sorting is another related process, illustrated here by 350. In this particular embodiment, this database may comprise of a file distribution determined by a set of improved score indices. Here, several statistical pattern recognition processes may be applied. For example, time dependent changes in a database population may be monitored and in conjunction with rules-based criteria, decisions may be invoked which modify the database ordering process previously described. For example, as a distribution changes over time, the cutoff score that determines categorization, for this embodiment, for example, may be made time dependent. For example, the cutoff score may be determined by a value between two modes in a bimodal distribution. As this shifts in time, a sorting category cutoff may be adjusted, for example.

Learning feedback is another process. Given that false positives and false negatives have been identified previously, for example, by identification with pre-sorted categories, files associated with false hits may be redirected to augment or supplant other files in the category training set. This file identification and feedback method may be used to improve sorting accuracy.

Figure 1:
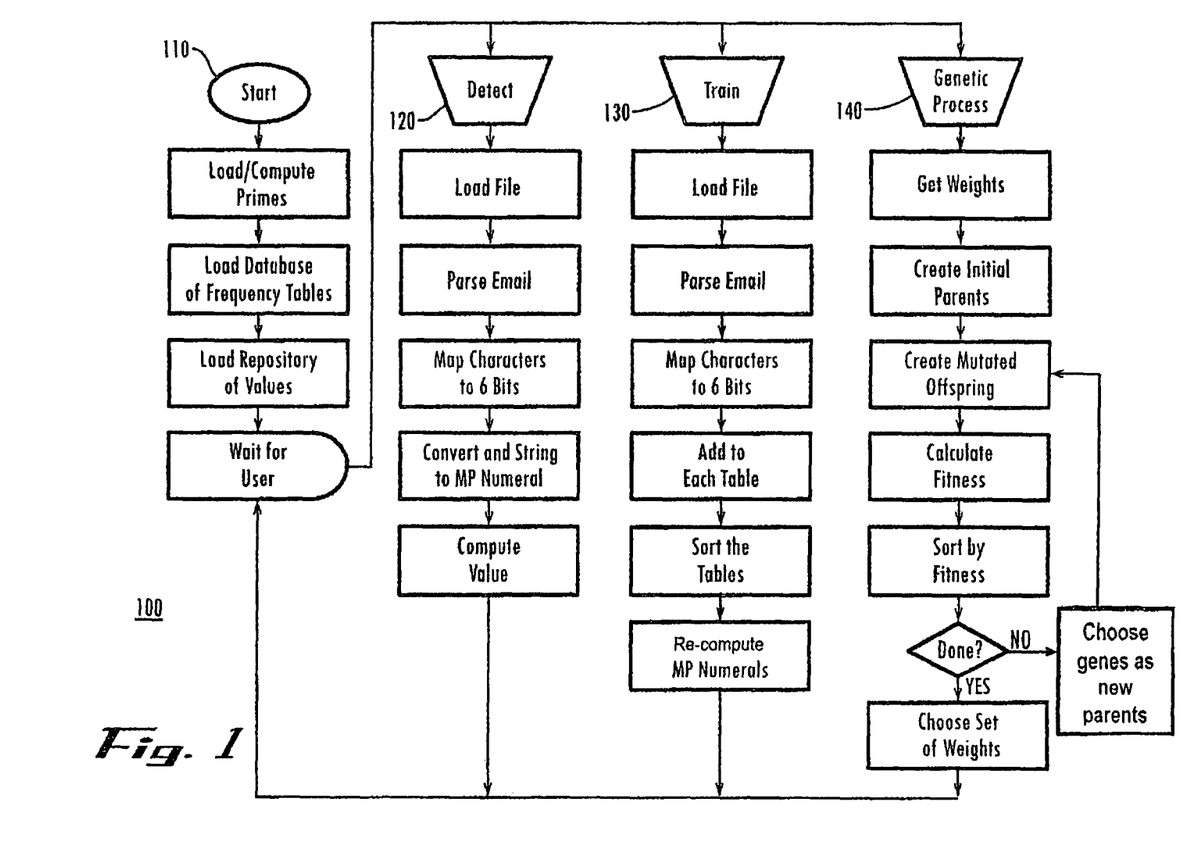
FIG. 1 is a flowchart illustrating an embodiment of a method of sorting digital information.

FIG. 1 is a flowchart illustrating an embodiment 100 of a method for sorting digital information, such as the embodiment previously described. Path 110 illustrates the initial process described in which, for this embodiment, a database of emails are evaluated. Path 120 illustrates applying the embodiment described previously to an incoming email, for example. For path 120, training, or retraining takes place as a result of the received email. More specifically, in this embodiment, the frequency or densities of particular character sequences are updated. For path 140, after updating the frequencies or densities, a genetic process is applied, as previously described. Of course, as previously indicated, this is a particular embodiment and many other embodiments are possible within the scope of claimed subject matter that may depart from the specifics of this particular example.

It is worth noting that embodiments of claimed subject matter may be employed in a variety of contexts and claimed subject matter is not limited in scope in this respect. For example, without limitation, in one embodiment, a web browser or similar software, may have the capability to download some portion of digital information from a website before information from the website is visually displayed. Likewise, such web browser or similar software, may apply an embodiment of sorting digital information, such as, for example, an approach similar to the example or embodiment previously described, and based at least in part on the results, provide categorization. Of course, claimed subject matter is not limited in scope to this example. Many other approaches to web browsers and/or other types of software, firmware and/or hardware within the scope of claimed subject matter are possible and included within the scope of claimed subject matter.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method for sorting signals representative of a portion or sub-portion of digital content via a local computing device, the method comprising:
   executing instructions on a sorting processor to:
      generate one or more signal tokens representative of a portion or sub-portion of a collection of digital content, wherein a relationship among the portion or sub-portion of the collection of digital content is unknown or unrecognized prior to the generation of the one or more signal tokens, wherein individual ones of the one or more signal tokens comprise parameters of at least a portion of one or more items of the collection of digital content;
      determine weights for one or more numerical signal values via a heuristic feedback mechanism
      assign the one or more numerical signal values, and the corresponding weights to the one or more signal tokens based at least in part on density of the one or more signal tokens, using a predominantly convex function;
      assign a category identifier for the one or more signal tokens based, at least in part, on comparing the one or more numerical signal values to category cutoffs;
      convert the signal tokens to one or more sorting signals representative of at least one sorting signal value, the at least one sorting signal value comprising a combination of the signal tokens corresponding to digital content in the portion or sub-portion of the collection;
      sort the one or more sorting signals representative of the portion or sub-portion of digital content based at least in part on the at least one sorting signal value to generate sorted signals representative of the portion or sub-portion of digital content; and
      adjust the category cutoffs based, at least in part, on time-dependent database population changes.

2. The method of claim 1, wherein the combination comprises an arithmetic or logical combination.

3. The method of claim 1, wherein the predominantly convex function comprises a prime-like function.

4. The method of claim 3, wherein the prime-like function comprises at least one of prime numeral bit length or prime numeral logarithm.

5. The method of claim 3, wherein a token with the highest density may be mapped via the prime-like function to the largest prime value in a prime sequence.

6. The method of claim 1, wherein when the numerical signal values are assigned to the one or more signal tokens based at least in part on the density of the one or more signal tokens, wherein the one or more signal tokens having a greater density are assigned greater numerals.

7. The method of claim 1, wherein the collection of digital content comprises a database and the portion or sub-portion comprises at least two files of the database.

8. The method of claim 7, and further comprising encoding the at least two files by converting the at least two files to at least one sorting signal value.

9. The method of claim 8, wherein the encoding includes parsing the at least two files.

10. The method of claim 8, and further comprising scoring the at least two files based at least in part on the at least one sorting signal value.

11. The method of claim 10, wherein the scoring includes detecting content images based at least in part on a mapping.

12. The method of claim 11, wherein the mapping is predominantly convex.

13. The method of claim 12, wherein the predominantly convex mapping is prime-like.

14. The method of claim 10, and further including ordering the at least two files of the database into a ranked order based at least in part on the scores for the at least two files.

15. The method of claim 14, wherein the ordering the at least two files of the database includes applying a genetic process.

16. The method of claim 1, and further including applying feedback to modify the converting process based at least in part on false positives and/or false negatives.

17. An article comprising: a storage medium having stored thereon instructions that are executable by a sorting processor to:
 process one or more electrical digital signals to comprise a portion or sub-portion of a collection of digital content;
 generate one or more signal tokens to be representative of the portion or sub-portion of the collection of digital content, wherein a relationship among the portion or sub-portion of the collection of digital content is unknown or unrecognized prior to the generation of the one or more signal tokens, wherein individual ones of the one or more signal tokens are to comprise parameters of at least a portion of one or more items of the collection of digital content;
 determine weights for one or more numerical signal values via a heuristic feedback mechanism;
 assign the one or more numerical signal values and the corresponding weights to the one or more signal tokens to be based at least in part on density of the one or signal tokens, using a predominantly convex function;
 assign a category identifier for the one or more signal tokens based, at least in part, on comparing the one or more signal values to category cutoffs;
 convert the signal tokens to one or more sorting signals representative of the at least one sorting signal value, the at least one sorting signal value is to comprise a combination of the signal tokens corresponding to digital content in the portion or sub-portion of the collection;
 sort the one or more sorting signals representative of the portion or sub-portion of digital content to be based at least in part on the at least one sorting signal value to generate sorted signals to be representative of the portion or sub-portion of digital content; and
 adjust the category cutoffs based, at least in part, on time-dependent database population changes.

18. The article of claim 17, wherein the combination is to comprise an arithmetic or logical combination.

19. The article of claim 17, wherein the predominantly convex function is to comprise a prime-like function.

20. The article of claim 19, wherein the prime-like function is to comprise at least one of prime numeral bit length or prime numeral logarithm.

21. The article of claim 19, wherein a token with the highest density may be mapped via the prime-like function to the largest prime value in a prime sequence.

22. The article of claim 17, wherein the numerical signal values are to be assigned to the one or more signal tokens to be based at least in part on the density of the one or more signal tokens, the one or more signal tokens having a greater density to be assigned greater numerals.

23. The article of claim 17, wherein the collection of digital content is to comprise a database and the portion or sub-portion is to comprise at least two files of the database.

24. The article of claim 23, wherein the instructions are further executable by the sorting processor to encode the file by converting the at least two files to at least one sorting signal value.

25. The article of claim 24, wherein the instructions are further executable by the sorting processor to encode the at least two files by parsing the at least two files.

26. The article of claim 24, wherein the instructions are further executable by the sorting processor to score the at least two files by sorting to be based at least in part on the at least one sorting signal value.

27. The article of claim 26, wherein the instructions are further executable by the sorting processor to detect content images to be based at least in part on a mapping.

28. The article of claim 27, wherein the mapping is to be predominantly convex.

29. The article of claim 28, wherein the predominantly convex mapping is to be prime-like.

30. The article of claim 26, wherein the instructions are further executable by the sorting processor to order the at least two files of the database into a ranked order to be based at least in part on the scores for the at least two files.

31. The article of claim 30, wherein the instructions are further executable by the sorting processor to order the database by applying a genetic process.

32. The article of claim 17, wherein the instructions are further executable by the sorting processor to modify the converting based at least in part on false positives and/or false negatives.

33. An apparatus comprising:
 means for generating one or more signal tokens representative of the portion or sub-portion of the collection of digital content, wherein a relationship among the portion or sub-portion of the collection of digital content is unknown or unrecognized prior to the generation of the one or more signal tokens, wherein individual ones of the one or more signal tokens are to comprise parameters of at least a portion of one or more items of the collection of digital content;
 means for determining weights for one or more numerical signal values via a heuristic feedback mechanism;

means for assigning the one or more numerical signal values and the corresponding weights to the one or more signal tokens to be based at least in part on density of the one or more signal tokens, using a predominantly convex function;

means for assigning a category identifier for the one or more signal tokens based, at least in part, on comparing the one or more numerical signal values to category cutoffs;

means for converting the signal tokens to one or more sorting signals representative of at least one sorting signal value, the at least one sorting signal value to comprise a combination of the signal tokens corresponding to digital content in the portion or sub-portion of the collection; and means for sorting the one or more sorting signals representative of the portion or sub-portion of digital content to be based at least in part on the at least one sorting signal value to generate sorted signals representative of the portion or sub-portion of digital content; and means for adjusting sorting category cutoffs based, at least in part, on time-dependent database population changes.

34. The apparatus of claim 33, wherein the combination is to comprise an arithmetic or logical combination.

35. The apparatus of claim 33, wherein the predominantly convex function is to comprise a prime-like function.

36. The apparatus of claim 35, wherein the prime-like function is to comprise at least one of prime numeral bit length or prime numeral logarithm.

37. The apparatus of claim 35, wherein a token with highest density may be mapped via the prime-like function to the largest prime value in a prime sequence.

38. The apparatus of claim 33, wherein the collection of digital content is to comprise a database and the portion or sub-portion is to comprise at least two files of the database.

39. The apparatus of claim 38, wherein the means for converting the at least two files to at least one sorting signal value.

40. The apparatus of claim 39, wherein the means for sorting includes means for parsing the at least two files.

41. The apparatus of claim 39, and further comprising means for scoring the at least two files to be based at least in part on the at least one sorting signal value.

42. The apparatus of claim 41, wherein the means for scoring includes means for detecting content images to be based at least in part on the means for assigning.

43. The apparatus of claim 42, wherein the predominantly convex means for assigning is to comprise a prime-like means for assigning.

44. The apparatus of claim 41, and further including: means for ordering the at least two files of the database into a ranked order to be based at least in part on the scores for the at least two files.

45. The apparatus of claim 44, wherein the means for ordering the database is to include means for applying a genetic process.

46. The apparatus of claim 33, wherein when the numerical signal values are assigned to the one or more signal tokens based at least in part on the signal tokens, the one or more signal tokens having a greater density are assigned greater numerals.

47. The apparatus of claim 33, and further including: means for applying feedback to modify the converting process to be based at least in part on false positives and/or false negatives.

* * * * *